(12) United States Patent  (10) Patent No.: US 8,776,845 B2
Hagano  (45) Date of Patent: Jul. 15, 2014

(54) FUEL TANK OPENING AND CLOSING DEVICE

(75) Inventor: Hiroyuki Hagano, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 503 days.

(21) Appl. No.: 13/168,359

(22) Filed: Jun. 24, 2011

(65) Prior Publication Data

US 2012/0000134 A1 Jan. 5, 2012

(30) Foreign Application Priority Data

Jun. 30, 2010 (JP) ................................. 2010-148759

(51) Int. Cl.
 B65B 3/04 (2006.01)
 B60K 15/04 (2006.01)
(52) U.S. Cl.
 CPC ......... *B60K 15/04* (2013.01); *B60K 2015/0445* (2013.01); *B60K 2015/0429* (2013.01)
 USPC ........... 141/350; 141/302; 141/348; 220/86.2
(58) Field of Classification Search
 USPC ................... 141/59, 302, 348–350; 220/86.2; 411/522, 519; 251/149.2, 228; 137/588; 29/453
 See application file for complete search history.

(56) References Cited

U.S. PATENT DOCUMENTS

| 5,197,841 | A  | * | 3/1993  | Tanaka ......................... 411/522 |
| 6,338,362 | B1 |   | 1/2002  | Gabbey et al. |
| 6,685,043 | B1 | * | 2/2004  | Long, Sr. ................... 220/254.5 |
| 6,923,224 | B1 | * | 8/2005  | McClung et al. ............. 141/350 |
| 7,163,037 | B2 | * | 1/2007  | Walkowski .................... 141/350 |
| 7,549,443 | B2 | * | 6/2009  | Levey et al. ................. 137/592 |
| 7,617,604 | B2 | * | 11/2009 | Levey et al. ............... 29/890.12 |
| 8,651,151 | B2 | * | 2/2014  | Berghorst et al. ............. 141/350 |

FOREIGN PATENT DOCUMENTS

| JP | S64-048428 U | 3/1989 |
| JP | 2007-331518 A | 12/2007 |
| WO | 2008/121605 A2 | 10/2008 |

* cited by examiner

*Primary Examiner* — Timothy L Maust
*Assistant Examiner* — Timothy P Kelly
(74) *Attorney, Agent, or Firm* — Posz Law Group, PLC

(57) ABSTRACT

A fuel tank opening and closing device is equipped with a flap valve mechanism arranged inside the tank opening forming member, having an opening and closing member for which the inlet is opened and closed by being pressed by the tip of the fueling nozzle, a shaft provided at the tip of the opening and closing member, and a bearing mechanism provided on the tank opening forming member for supporting the shaft so as to be rotatable. The bearing mechanism has a shaft support recess in which the shaft is inserted and a plurality of shaft restriction projections provided projecting from the wall surface of the shaft support recess, and the shaft restricting projections have a cross section arc shaped shaft support surface such that there is contact with a portion of the outer periphery of the shaft.

5 Claims, 15 Drawing Sheets

FUEL TANK OPENING AND CLOSING DEVICE

This application claims the benefit of and priority from Japanese Application No. 2010-148759 filed Jun. 30, 2010, the content of which is incorporated herein by reference.

BACKGROUND OF THE INVENTION

1. Field of the Invention

The present invention relates to a fuel tank opening and closing device for opening a flap valve using the insertion force of a fueling nozzle to fuel a fuel tank.

2. Description of the Related Art

An example of a fuel tank opening and closing device is disclosed in JP-A 2007-331518 as a fuel cap including a flap valve mechanism. The flap valve mechanism is equipped with an opening and closing member arranged at the inlet of the fuel path, and the shaft protruding from the end part of the opening and closing member, the shaft is inserted into the through hole of the tank opening forming member and supported to be rotatable. The opening and closing member is sealed by energization of the spring in the closing direction. With this constitution, the inlet is opened by the opening and closing member being pressed with the fueling nozzle during fueling in opposition to the energization force of the spring, and fuel is injected from the fueling nozzle.

However, when the tank opening forming member is formed from resin, due to shrinkage of the resin, the through hole does not become a cross sectional circle that matches the shaft of the opening and closing member, positional displacement of the shaft occurs in assembly. The positional displacement causes to be fluctuation of the seal surface pressure of the opening and closing member. Because of this, there was the problem that a great deal of effort was required to increase the through hole forming precision.

SUMMARY

An advantage of some aspects of the invention is to provide a fuel tank opening and closing device that is able to open and close in a stable attitude without needing to increase the forming precision of the bearing mechanism that supports the opening and closing member so as to be rotatable.

According to an aspect of the invention there is a fuel tank opening and closing device for opening and closing a path for supplying fuel to a fuel tank. The fuel tank opening and closing device comprises: a tank opening forming member for forming (i)an insertion path for inserting a fueling nozzle, and (ii) a fuel path which has an inlet connected to the insertion path and is connected to the fuel tank, and a flap valve mechanism arranged inside the tank opening forming member, and having (i) an opening and closing member for opening and closing the inlet by being pressed by an end of the fueling nozzle, (ii) a shaft provided at an end of the opening and closing member, and (iii) a bearing mechanism provided on the tank opening forming member for rotatably supporting the shaft. The bearing mechanism has (i) a shaft support recess in which the shaft is inserted, and (ii) a plurality of shaft restriction projections projecting from a wall surface of the shaft support recess, wherein each of the shaft restriction projection has a shaft support surface shaped as arc surface in a cross section, the support surface being configured to contact a part of an outer periphery of the shaft.

With the fuel tank opening and closing device of application example 1, the fueling nozzle is inserted from the insertion path of the tank opening forming member, and when the tip of the fueling nozzle presses on the opening and closing member to press the fueling nozzle in, the opening and closing member of the flap valve mechanism opens, and furthermore, the fueling nozzle is inserted through the inlet for fueling to the fuel path.

Also, the opening and closing member is supported so as to be rotatable by having the shaft inserted in the shaft support recess of the bearing mechanism provided on the tank opening forming member. At the inner wall of the shaft support recess, a plurality of shaft restriction projections having a cross section arc shaped shaft support surface are provided, these contact part of the shaft outer periphery and are supported to be rotatable. The plurality of shaft restriction projections are divided with a groove between them, so compared to a case of supporting the shaft by forming the cross section circle shape simply by the shaft support recess, do not require high forming precision of the shaft support surface of each shaft bearing projection, and forming work is easier. In fact, when forming the tank opening forming member using resin, even if each shaft restriction projection has slight deformation of the circle shape formed by their arcs due to shrinkage of the resin, this is supported along part of the outer periphery of the shaft of the opening and closing member so that shaft shaft core displacement does not occur, so there is no unevenness or decrease in the seal surface pressure of the opening and closing member that comes with shaft positional displacement.

With application example 2, the shaft restriction projection can have a constitution equipped with the shaft restriction projections comprise a bottom arc portion that is formed on a bottom of the shaft support recess, and a side arc portion that is formed close to the bottom arc portion in a circumferential direction of the shaft across a groove.

With application example 3, the shaft support recess is equipped with an opening that opens in an opposite direction to an insertion direction of the fueling nozzle, the shaft restriction projection includes an opening projection projecting so as to restrict an opening width of the shaft support recess more narrow than an diameter of the shaft, and the opening projection elastically deforms and holds the shaft at a position touching the shaft restriction projection when the shaft is inserted in the shaft support recess, thereby preventing the shaft from slipping off the shaft support recess. With this constitution, the opening projections can further prevent shaft positional displacement.

With application example 4, it is possible to use a constitution for which the he tank opening forming member comprises a connecting tube which forms the fuel path, an inlet forming member having the inlet mounted inside that connecting tube, and a fitting member attached to the inlet forming member and forming the support recess, and the inlet forming member includes a restraining member that is inserted in the opening of the shaft support recess and retains the shaft. With this constitution, the shaft support recess can easily have the shaft inserted from the opening, and furthermore, it is possible for the restraining member to prevent falling out of the shaft when the fitting member and the inlet forming member are linked.

With application example 5, it is possible to have a constitution such that a virtual inner diameter is the same or slightly larger than an outer diameter of the shaft, where the virtual inner diameter is defined by an inner diameter of the circle formed following the shaft support surfaces of the shaft restriction projections.

With application example 6, it is possible to have a constitution such that the side arc portion comprises a first side arc portion and a second side arc portion arranged at both sides of the circumferential direction of the bottom arc portion, wherein the first side arc portion is arranged at a position for which the load received from the shaft during opening and closing of the opening and closing member is greater than that of the second side arc portion, and the first side arc portion is formed so that a surface accuracy of the shaft support surface is higher than that of the second side arc portion.

These and other objects, features, aspects, and advantages of the present invention will become more apparent from the following detailed description of the preferred embodiments with the accompanying drawings.

BRIEF DESCRIPTION OF THE DRAWINGS

DESCRIPTION OF THE PREFERRED EMBODIMENTS (1) General Constitution of the Fuel Tank Opening and Closing Device FIG. 1 shows the back part of a vehicle using the fuel tank opening and closing device of an embodiment of the present invention. At the back part of the car body of the vehicle, a fueling lid FL for fueling fuel (light oil) is supported to be able to open and close. The fueling lid FL is supported so that the lid main body FLa following the outer panel of the car body is able to open and close at the outer panel of the car body via the hinge FLb. The space that opens for the fueling lid FL becomes the fueling chamber FR, and inside this fueling chamber FR is placed the fueling tank opening and closing device 10 supported on a base plate BP. The fuel tank opening and closing device 10 is a mechanism for supplying fuel to the fuel tank without using a fuel cap, and it is a mechanism that, after the fueling lid FL is opened, supplies fuel to the fuel tank from the fueling nozzle by opening the fuel path with external force from the fueling nozzle. Following, we will give a detailed description of the constitution of the fuel tank opening and closing device.

(2) Constitution and Operation of Each Part

Figure 2:
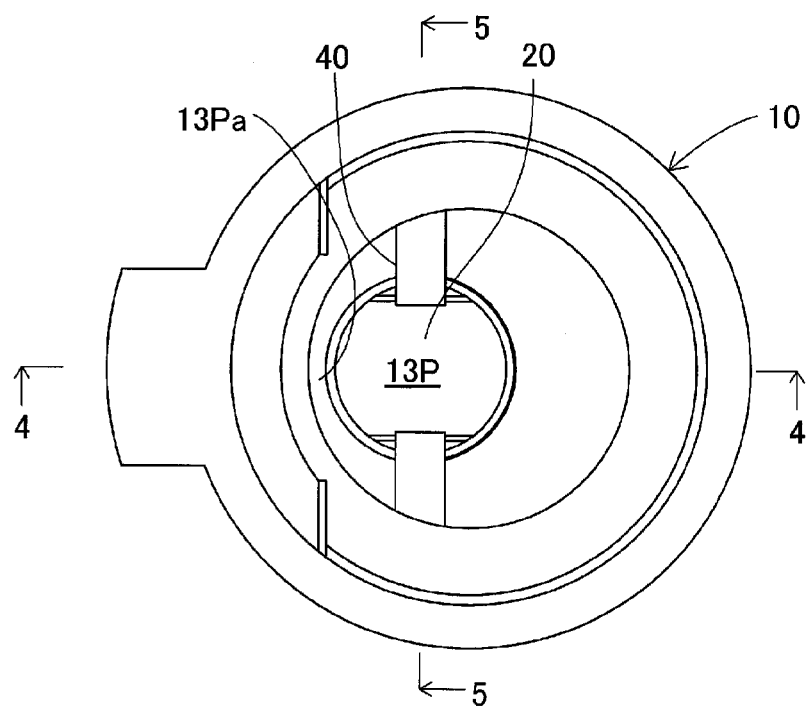
FIG. 2 is a plan view showing the aperture part of the fuel tank opening and closing device.
Figure 3:
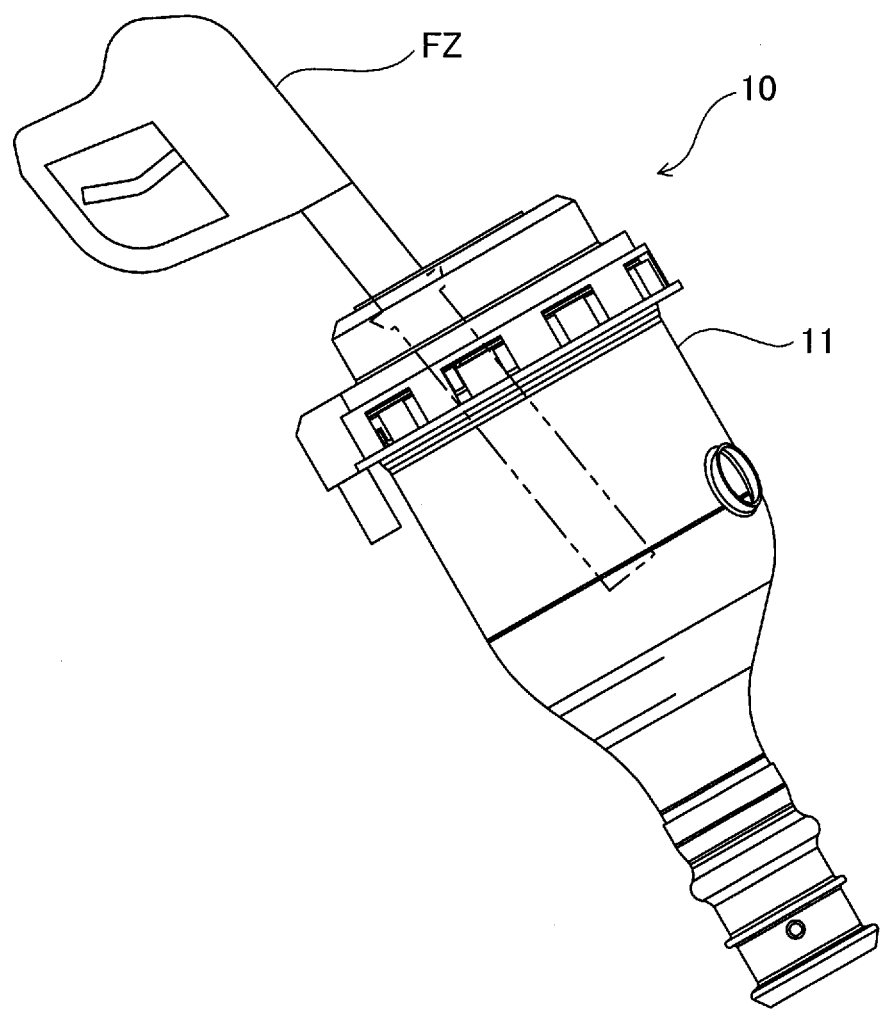
FIG. 3 is an external view showing the fuel tank opening and closing device during fueling.
Figure 4:
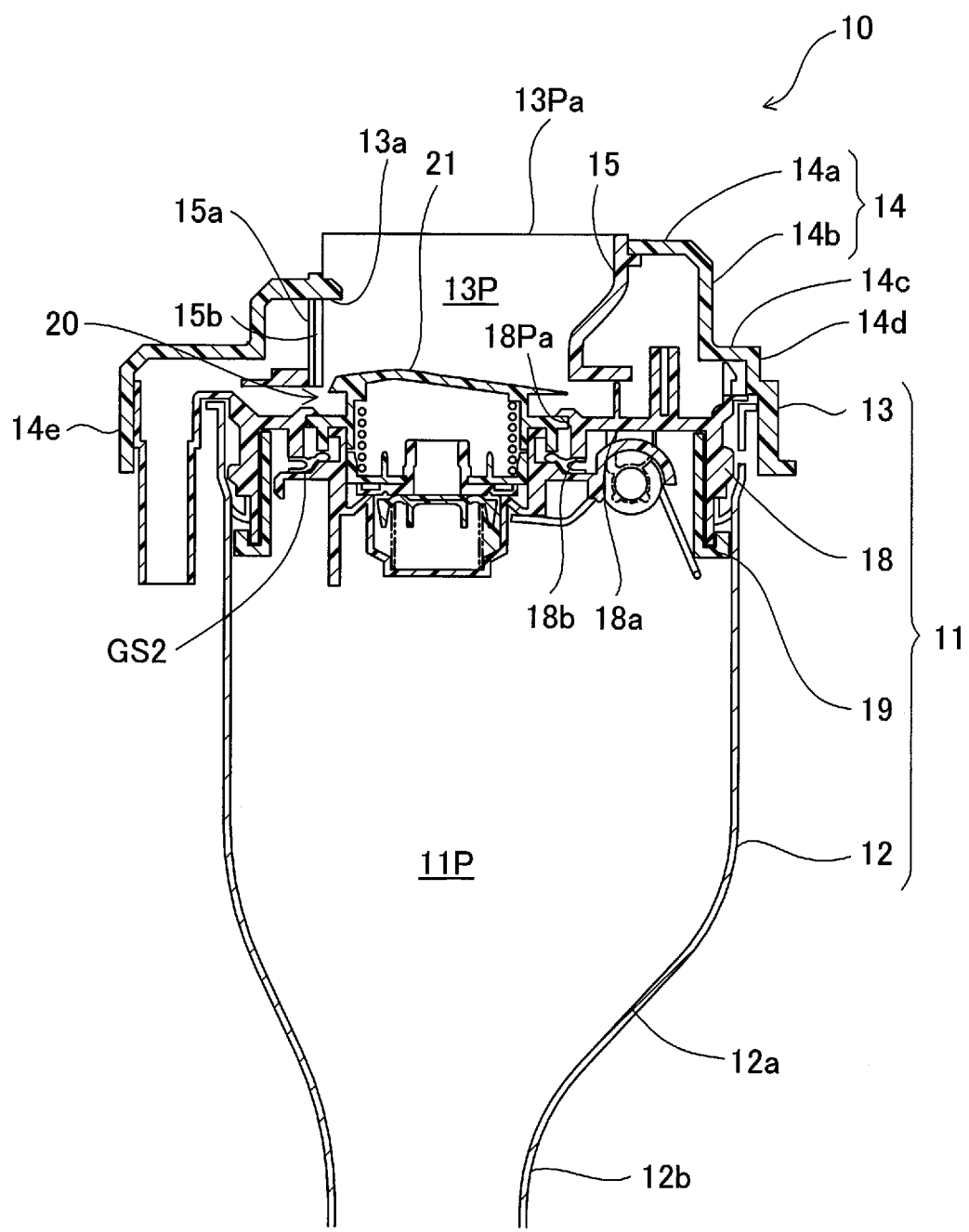
FIG. 4 is a cross section diagram along line 4-4 of FIG. 2.
Figure 5:
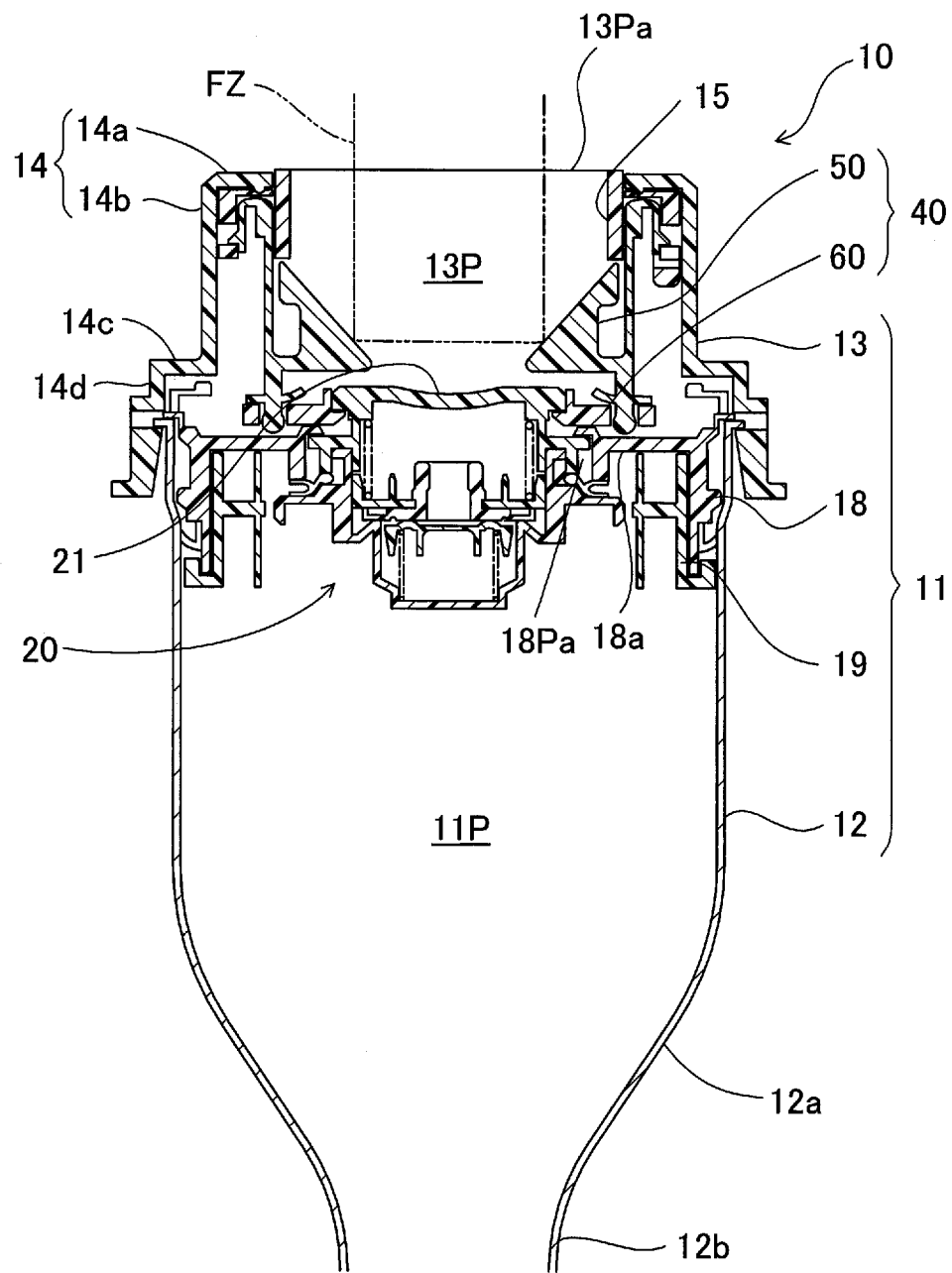
FIG. 5 is a cross section diagram along line 5-5 of FIG. 2.

FIG. 2 is a plan view showing the aperture part of the fuel tank opening and closing device 10, FIG. 3 is an external view of the fuel tank opening and closing device 10 during fueling, and FIG. 4 is a cross section diagram along line 5-5 of FIG. 2. In FIG. 4 and FIG. 5, the fuel tank opening and closing device 10 is equipped with a tank opening forming member 11 having a fuel path 11P connected to the fuel tank (not illustrated), a flap valve mechanism 20, and an opening and closing activation mechanism 40 for opening and closing the flap valve mechanism 20.

(2)-1 Tank Opening Forming Member 11

In FIG. 4, the tank opening forming member 11 is a tube unit having a fuel path 11P, and is equipped with a metal connecting tube 12 connected to the fuel tank, an aperture forming member 13 fixed on the top part of the connecting tube 12, an inlet forming member 18 mounted on the top part of the connecting tube 12, and a fitting member 19 for fixing the inlet forming member 18 to the connecting tube 12.

The connecting tube 12 is equipped with a reduced diameter part 12a for which the fuel tank side is gradually reduced in diameter, and a straight tube part 12b connected to the reduced diameter part 12a, and these form a single unit. The aperture forming member 13 is equipped with a cylindrical outer wall 14 on the top part of the connecting tube 12, and an inner wall 15 arranged inside the outer wall 14, forming an insertion path 13P for inserting the fuel nozzle FZ.

The outer wall 14 is equipped with a top surface part 14a and a side surface part 14b forming the introduction port 13Pa, which is formed in a cup shape. The bottom part of the outer wall 14 becomes a bottom part cylinder part 14d from the slightly broadened in diameter broadened diameter part 14c. Also, at part of the broadened diameter part 14c, an ejection upper tube 14e for ejecting fuel that overflowed during fueling from the insertion path 13P is provided projecting downward.

The inner wall 15 is a wall surface forming the insertion path 13P, and the introduction port 13Pa is formed at that aperture part. Also, a gun stopper 13a is formed at the a aperture edge part of the introduction port 13P and the top part of the inner wall 15. Also, a plurality of rows of slits 15a are formed in the insertion direction at the inner wall 15. The slit 15a forms a path connecting from the insertion path 13P to the ejection upper tube 14e, and prevents fuel from pooling in the insertion path 13P.

Figure 6:
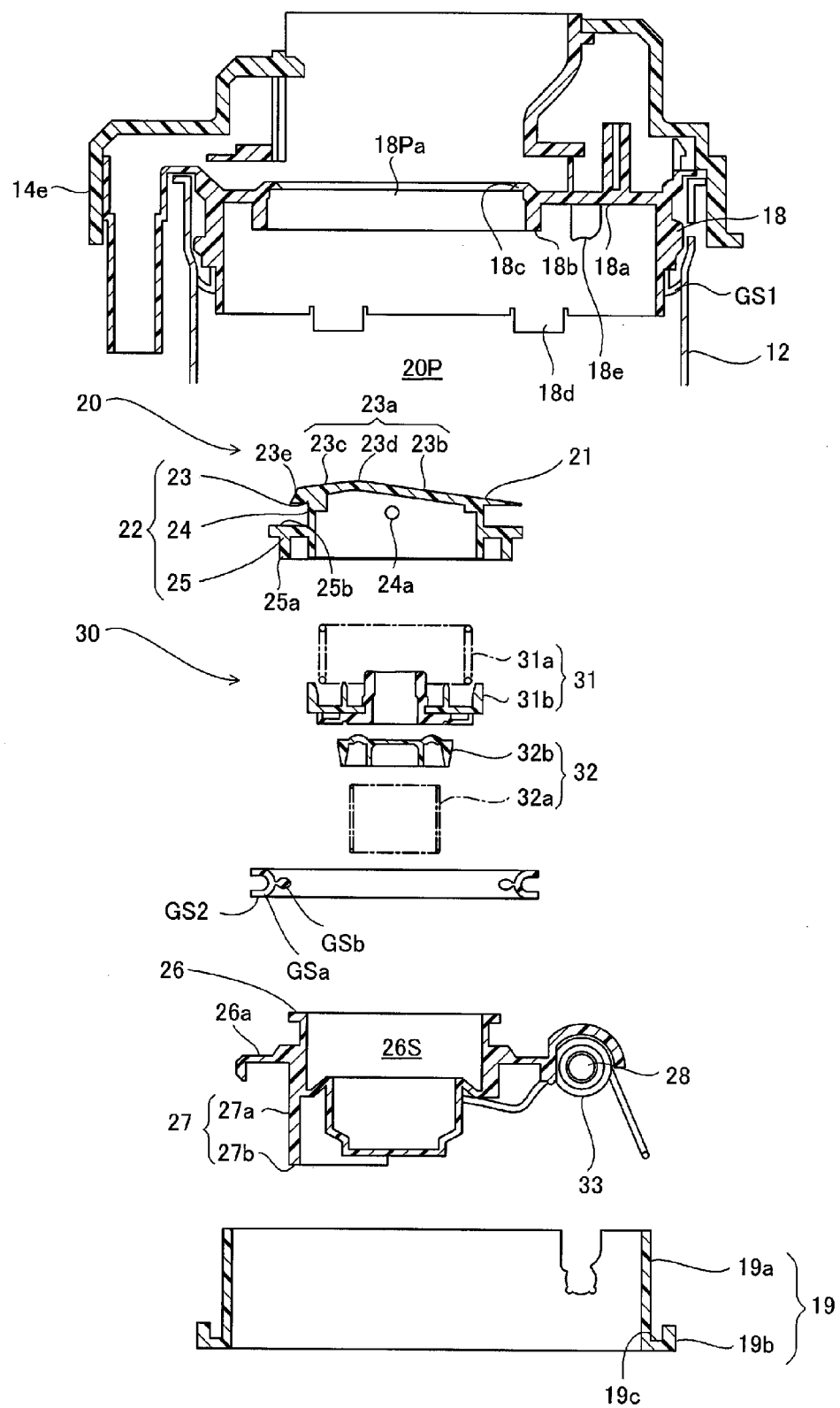
FIG. 6 is a cross section exploded view of the peripheral part of the flap valve mechanism.

FIG. 6 is an exploded cross section view of the fuel tank opening and closing device 10. The flap valve mechanism 20 is fixed to the connecting tube 12 via the inlet forming member 18 and the fitting member 19, and furthermore, the inner wall of the connecting tube 12 is sealed via a gasket GS1. The inlet forming member 18 is fixed to the top part of the connecting tube 12, and is a member for supporting a part of the flap valve mechanism 20, and is equipped with a circular plate part 18a having an inlet 18P which forms part of the fuel path 11P, and furthermore an engaged claw 18d is provided projecting for linking to the fitting member 19. The fitting member 19 is mounted on the top part of the connecting tube 12, is equipped with a cylindrical wall 19a and a flange 19b, has an insertion recess 19c for inserting the tip of the inlet forming member 18 formed between those, and by engaging the engaged claw 18d of the inlet forming member 18 in the engaging hole (not illustrated) formed at the bottom of the insertion recess 19c, is integrated with the inlet forming member 18 and fixed to the connecting tube 12.

The flap valve mechanism 20 is equipped with an opening and closing member 21, a spring 33, and a gasket GS. The opening and closing member 21 is axially supported on the inlet forming member 18, and is a member for opening and closing the inlet 18Pa. The spring 33 is a coil spring, one end part of that coil shape is supported on the inlet forming member 18, and the other end part is supported on the opening and closing member 21 and energized in the direction that closes the opening and closing member 21. The opening and closing member 21 is equipped with a pressing member 22, a valve chamber forming member 26, a shaft 28, a pressure regulating valve 30, and the gasket GS.

Figure 7:
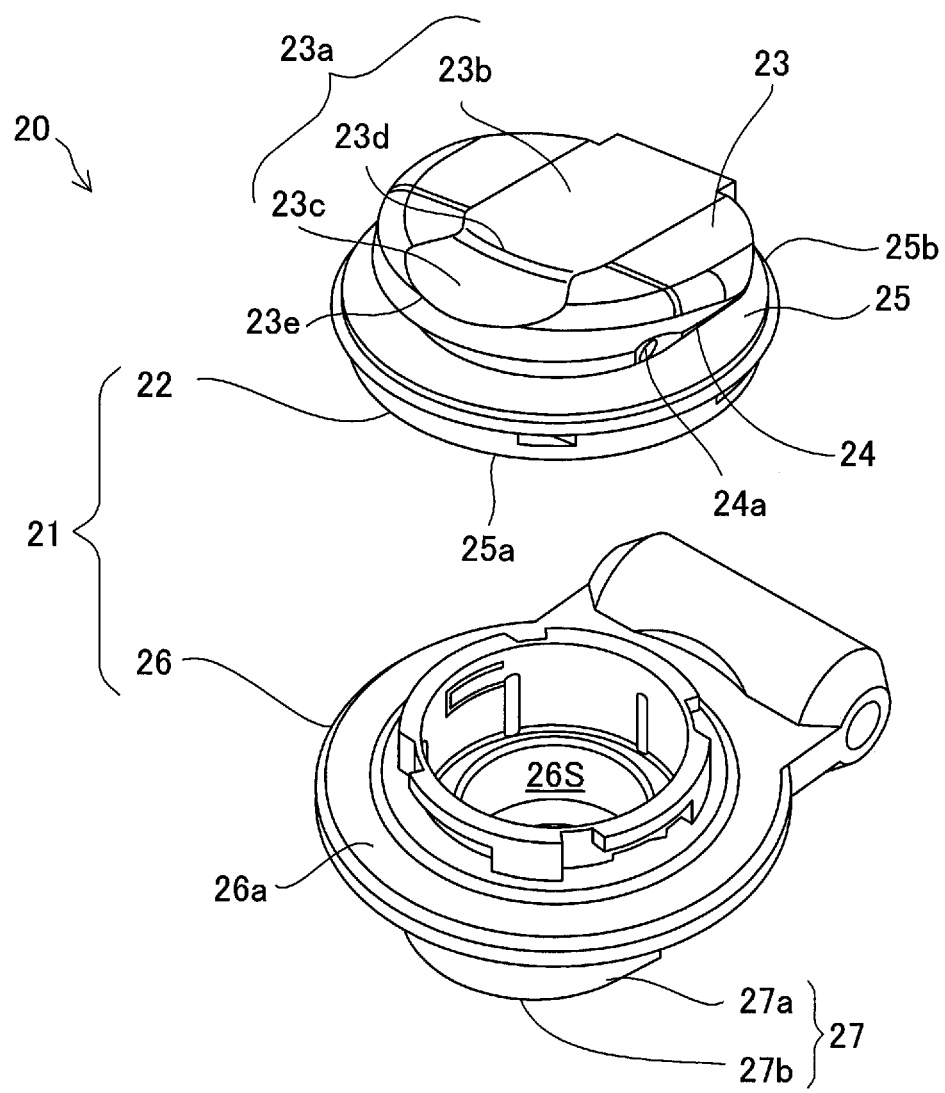
FIG. 7 is a perspective exploded view of part of the flap valve mechanism.

FIG. 7 is an exploded perspective view of part of the flap valve mechanism 20. The pressing member 22 is an almost tube shaped member with a bottom that directly receives the pressing force of the fueling nozzle FZ, it is formed from a conductive resin, and is formed by a top surface part 23, a side wall 24 provided projecting from the outer periphery of the top surface part 23, and a flange 25. On the top surface part 23 is formed a guide curved surface 23a for smoothing the touching with the fueling nozzle FZ and also for positioning the fueling nozzle FZ. The guide curved surface 23a is equipped with an introduction guide surface 23b and a tilted guide surface 23c, and between that is the positioning ridge line 23d. Moreover, the nozzle positioning guide mechanism for the guide curved surface 23a will be described later. A ventilation hole 24a is formed on the side wall 24, and this passes air to the pressure regulating valve 30. The flange 25 has a pressing side stopper 25b, and by touching the opening side stopper 18c of the inlet forming member 18, in a state with the opening and closing member 21 closed, it prevents infiltration of rain water or the like to the inside by eliminating the gap with the inlet 18Pa.

The valve chamber forming member 26 is a cap shape, and forms a valve chamber 26S that houses the pressure regulating valve 30. A flange 26a is formed at the outer periphery part of the valve chamber forming member 26. The gasket GS is formed from a rubber material, and is equipped with a C shaped seal main unit GSa, and a support part GSb of the inner periphery part of the seal main unit GSa, the support part GSb is held by being sandwiched between the top surface of the inner periphery side of the flange 26a and the seal pressing part 25a of the flange 25, and the top surface of that outer periphery side seals the inlet 18Pa by compressing the gasket GS with the seal part 18b.

The pressure regulating valve 30 is housed inside the valve chamber 26S that is surrounded by the pressing member 22 and the valve chamber forming member 26 and connected to the ventilation hole 24a, and it is equipped with a positive pressure valve 31 having a positive pressure valve unit 31b energized by the spring 31a and a negative pressure valve 32 having a negative pressure valve unit 32b energized by the spring 32a, and for the fuel tank pressure, the tank internal pressure of the fuel tank is adjusted to within a specified range by opening and closing both valve units.

(2)-3 Fueling Nozzle FZ Positioning Mechanism

Figure 8:
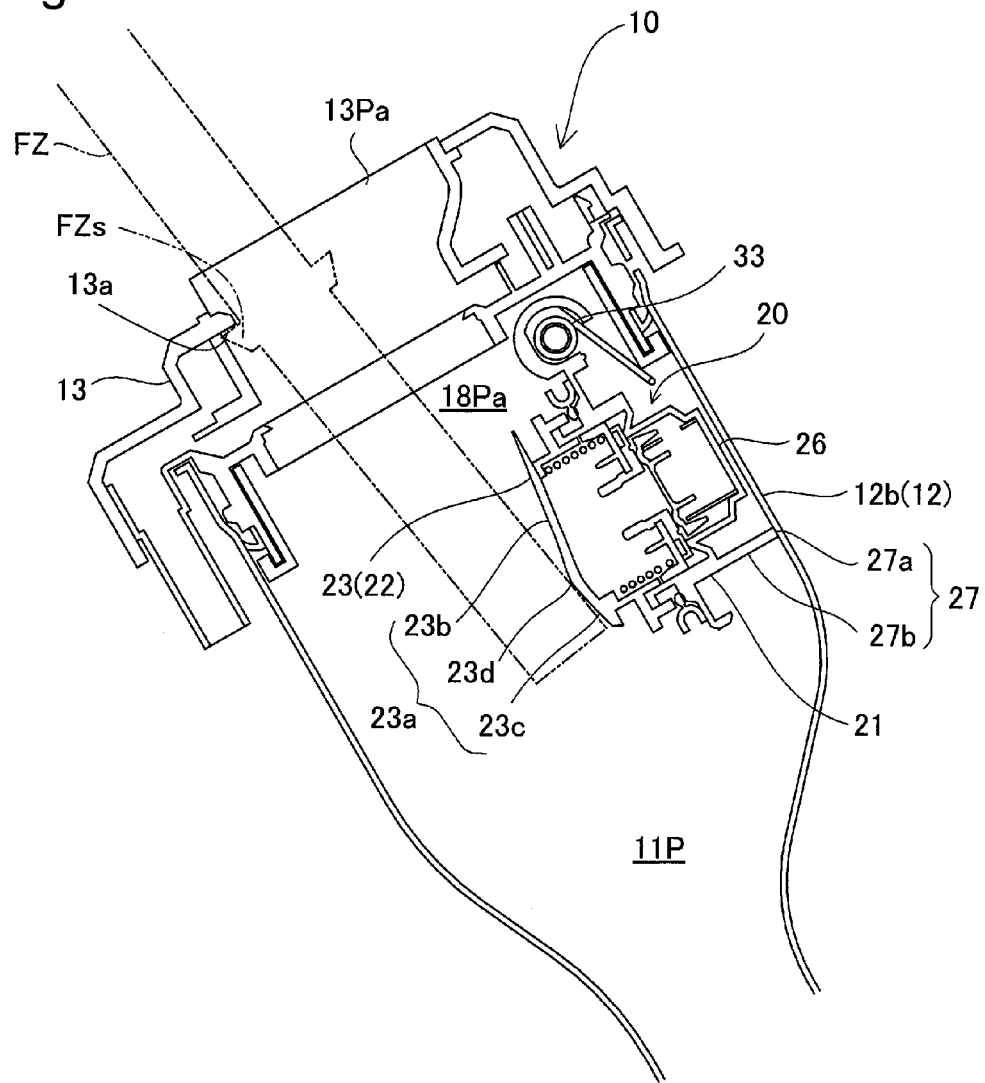
FIG. 8 is an explanatory drawing for describing the state of fueling with the fuel tank opening and closing device.
Figure 9:
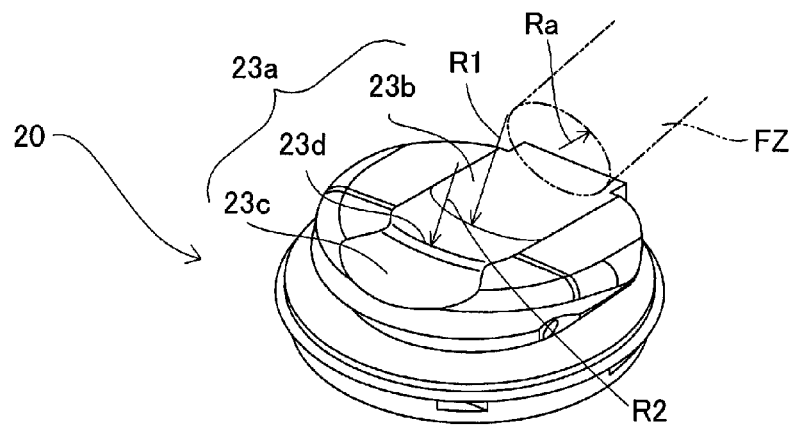
FIG. 9 is an explanatory drawing for describing the second support mechanism of the nozzle positioning guide mechanism of the flap valve mechanism.
Figure 10:
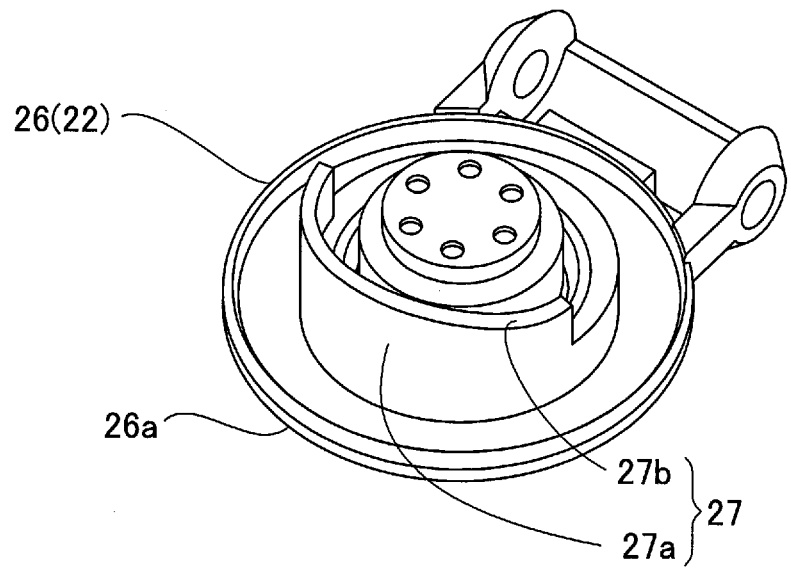
FIG. 10 is an explanatory drawing for describing the third support mechanism of the nozzle positioning guide mechanism of the flap valve mechanism.

FIG. 8 shows the state of fueling to the fuel tank opening and closing device 10. A positioning mechanism for positioning the fueling nozzle FZ during fueling is formed on the fuel tank opening and closing device 10. The positioning mechanism is constituted by cooperation of each member of the aperture forming member 13, the top surface part 23 of the flap valve mechanism 20, and the valve positioning member 27. Specifically, the gun stopper 13a for positioning the fueling nozzle FZ in the insertion direction (pull out direction) by engaging with the nozzle locking part FZs of the fueling nozzle FZ is formed on the opening peripheral edge of an introduction port 13Pa of the aperture forming member 13 (first support mechanism). Also, on the guide curved surface 23a of the top surface part 23 is formed a positioning ridge line positioning ridge line 23d for positioning the tip of the fueling nozzle FZ, after it is guided along the introduction guide surface 23b, in the left right direction (horizontal direction) of the fueling nozzle FZ by touching the outer peripheral surface of the fueling nozzle FZ (second support mechanism). The curvature of the guide curved surface 23a and the positioning ridge line 23d are determined considering the radius Ra of the fueling nozzle FZ, specifically, being formed to follow the outer shape of the fueling nozzle FZ, so that when the radius of the introduction guide surface 23b is R1, and the radius of the positioning ridge line 23d is R2, the radius Ra is larger than radius Ra, and radius R2 is almost the same but slightly larger than radius Ra. Furthermore, as shown in FIG. 10, a semi-cylinder valve positioning member 27 is formed at the bottom part of the valve chamber forming member 26 of the pressing member 22 (third support mechanism). The valve positioning member 27 has a positioning main unit 27a and an abutting part 27b curved at the edge surface of the valve positioning member 27, and as shown in FIG. 8, by the abutting part 27b touching the straight tube part 12b of the connecting tube 12, the closing member 21, even when pressed on the fueling nozzle FZ, does not have its degree of openness become any greater. Thus, the fueling nozzle FZ positioned by the positioning ridge line 23d is positioned in the vertical direction.

(2)-4 Grounding Path

Figure 11:
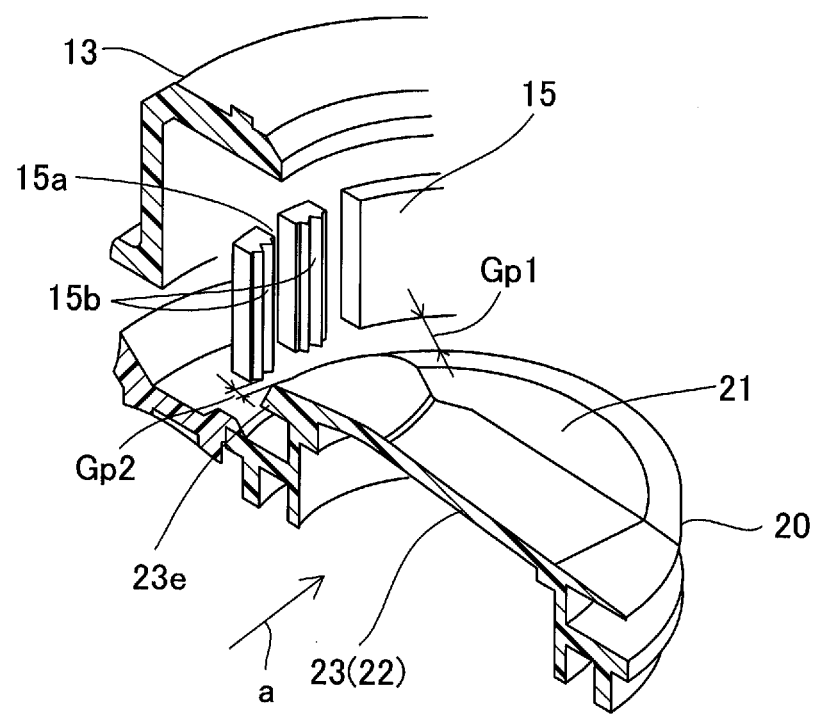
FIG. 11 is an explanatory drawing for describing the grounding path of the flap valve mechanism.
Figure 12:
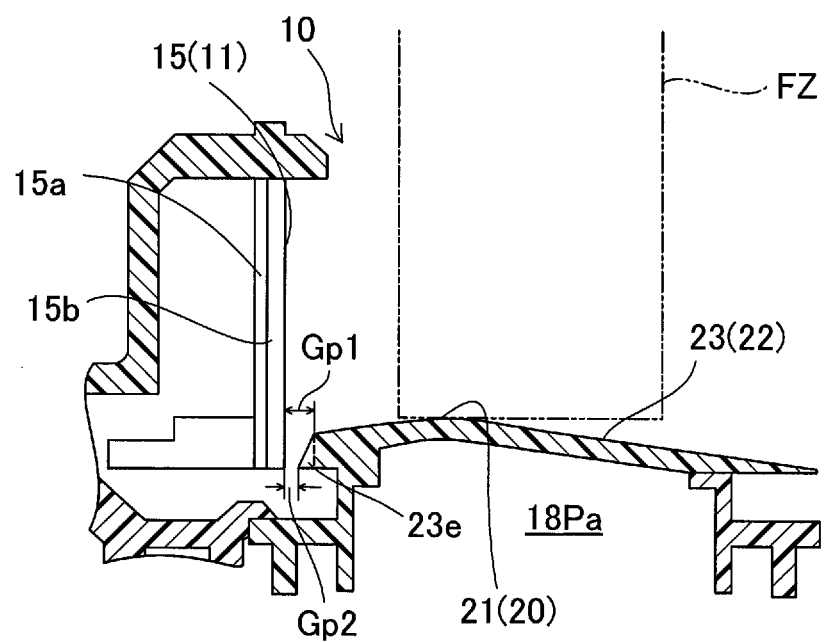
FIG. 12 is a view seen from the arrow direction a of FIG. 11.

In FIG. 4, by having part of the aperture forming member 13 and the opening and closing member 21 formed from a conductive member, a grounding path is constituted that releases the static electricity that occurs during fueling to the car body side member through the fueling nozzle FZ or the metal connecting tube 12. FIG. 11 is a perspective view of the vicinity of the flap valve mechanism with part cut away, and FIG. 12 is a view seen from the arrow direction a of FIG. 11. The pressing member 22 of the opening and closing member 21 has at least the surface formed using a conductive material, and its tip part is the discharge projection 23e. Also, a discharge projection 15b is formed in a rib shape at the inner wall 15 of the aperture forming member 13 facing opposite the discharge projection 23e. In a state with the opening and closing member 21 closed, with the gap between the outer periphery part of the pressing member 22 and the inner wall 15 as Gp1, and the gap between the discharge projection 23e and the discharge projection 15b as GP2, this is formed with Gp1>Gp2. Specifically, the gap Gp2 is set to 0.5 mm or less, and discharge is possible by insulation destruction in the air. The conductive material forming the aperture forming member 13 and the pressing member 22 is obtained by using one or combining a plurality of conductive whisker, conductive carbon, or conductive graphite powder and mixing this in resin, for example to 100 weight parts polyacetal or polyamide (PA) are mixed 5 weight parts conductive whisker and 10 weight parts conductive carbon. Here, as a conductive whisker, (commercial name Dentall: made by Otsuka Kagaku) can be used, and as the conductive carbon, (commercial name Vulcan XC-72: made by Cabot Corp.) can be used. Note that as a resin for giving conductivity, in addition to polyacetal and polyamide, it is also possible to use any material that is excellent in terms of fuel resistance and fuel permeation resistance, for example fluorine resin (ETFE) or the like.

Figure 13:
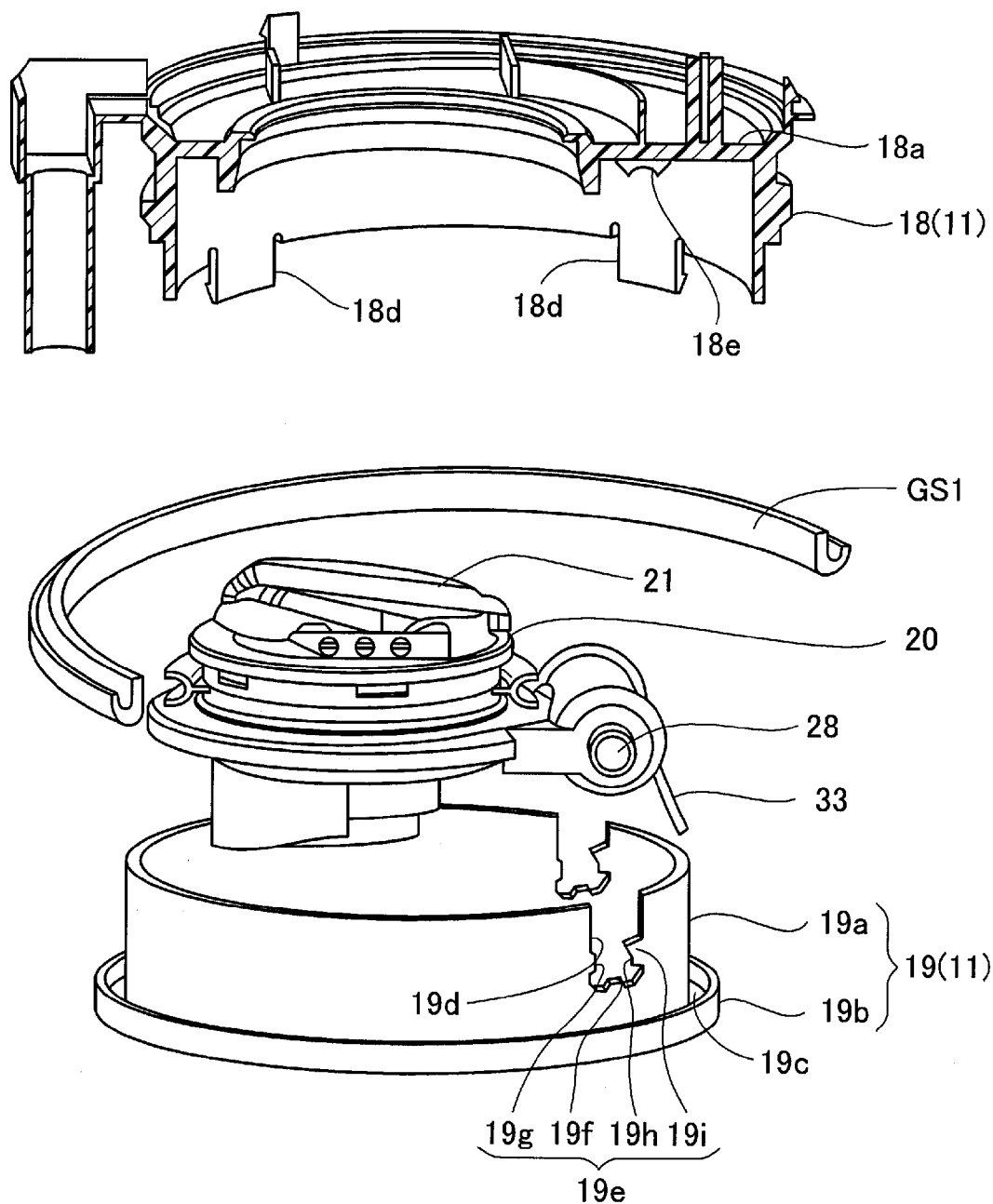
FIG. 13 is an exploded perspective view of the opening and closing activation mechanism.
Figure 14:
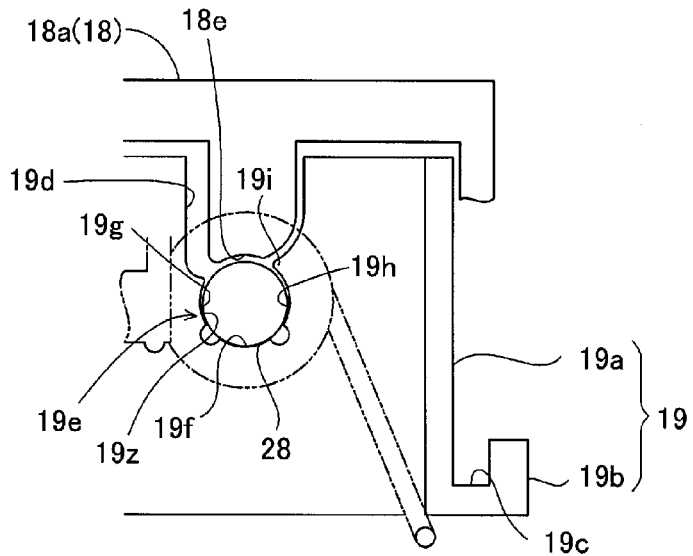
FIG. 14 shows the periphery of the bearing mechanism of the flap valve mechanism.
Figure 15:
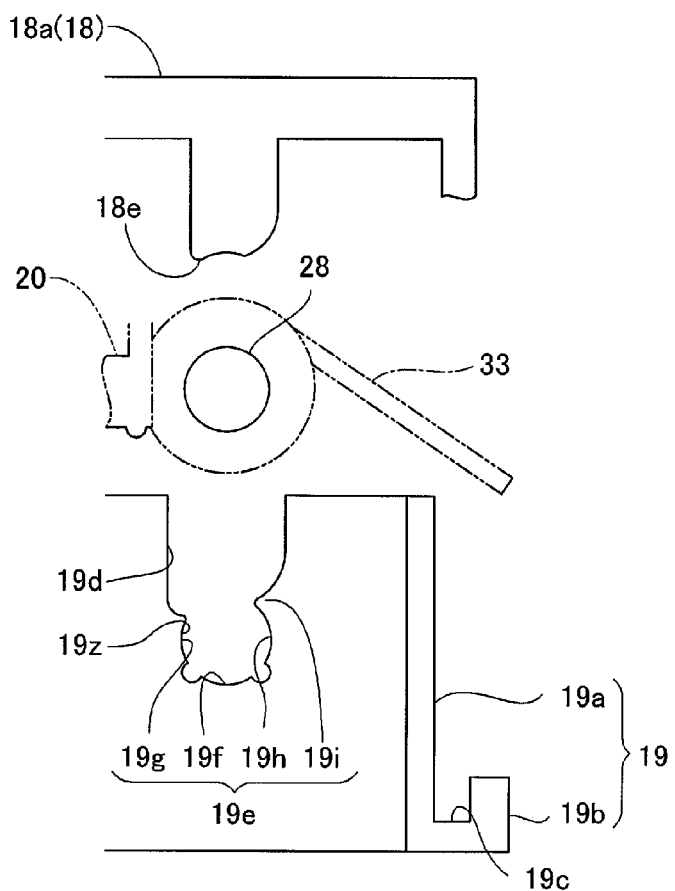
FIG. 15 shows the opening and closing member prior to being assembled to the bearing mechanism.

FIG. 13 is an exploded and partially fractured perspective view of the vicinity of the flap valve mechanism 20. The shaft 28 is provided at the side part of the opening and closing member 21. The shaft 28 is supported so as to be rotatable by the bearing mechanism provided on the fitting member 19 of the tank opening forming member 11. FIG. 14 shows the vicinity of the bearing mechanism of the flap valve mechanism 20, and FIG. 15 shows the state before attaching the opening and closing member 21 to the bearing mechanism. The bearing mechanism has a shaft support recess 19d in which the shaft 28 of the opening and closing member 21 is inserted and is supported so as to be rotatable. The shaft support recess 19d is an elongated hole opened upward such that the shaft 28 can be inserted from above. On the inner wall of the shaft support recess 19d is formed a shaft restriction projection 19e constituted from a plurality of projections. The shaft restriction projection 19e has a shaft support surface 19z in a cross section arc shape facing the shaft 28 so as to contact part of the outer periphery of the shaft 28, and is equipped with a bottom arc portion 19f, a first side arc portion 19g, a second side arc portion 19h, and an opening projection 19i. The bottom arc portion 19f is formed in an arc shape at the bottom of the shaft support recess 19d. The first side arc portion 19g and the second side arc portion 19h are respectively formed in arc shapes separated by a groove at both sides of the bottom arc portion 19f. Here, the first side arc portion 19g is a projection for constantly receiving large force from the shaft 28 within the operating range of the opening and closing member 21 as compared with the second side arc portion 19h, so it is formed into a higher precision arc than the second side arc portion 19h. The inner diameter of the circle formed following the arc of the shaft restriction projection 19e is formed to be the same or slightly larger than the outer diameter of the shaft 28. The opening projection 19i is formed on the opening of the shaft support recess 19d, and is a projection for restraining the shaft 28, and is elastically deformed when the shaft 28 is inserted into the shaft support recess 19d. Also, a restraining member 18e is provided projecting at the bottom part of the circular plate part 18a of the inlet forming member 18. The restraining member 18e is inserted in the upper space of the shaft support recess 19d, and prevents positional displacement of the shaft 28 upward. Note that the operational effect of the bearing mechanism with the constitution noted above will be described later.

Figure 16:
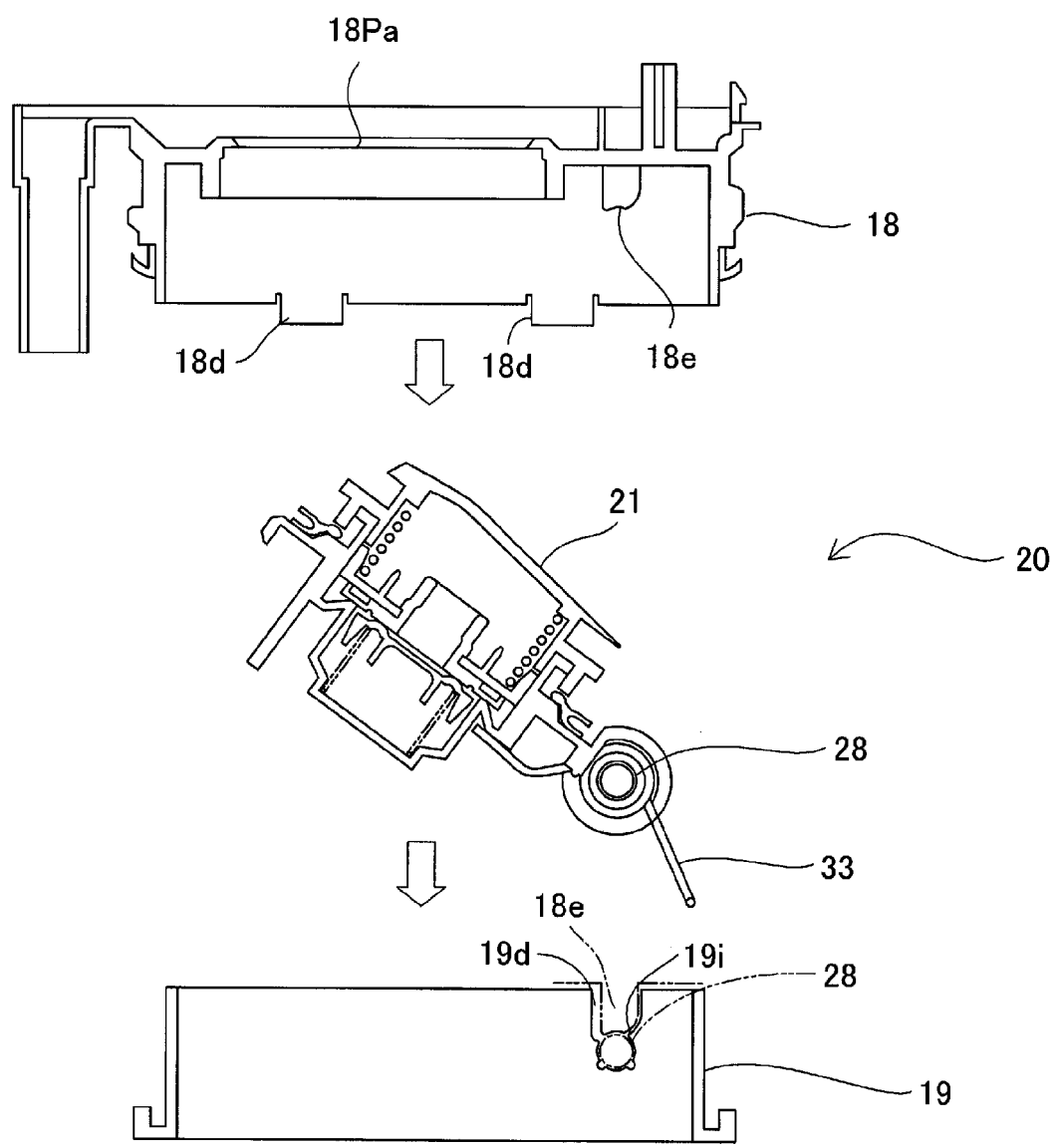
FIG. 16 shows the assembly operations of the flap valve mechanism.

FIG. 16 shows the assembly work of the flap valve mechanism. As shown in FIG. 16, to attach the opening and closing member 21 of the flap valve mechanism 20 to the inlet forming member 18 and the fitting member 19, the opening and closing member 21 is tilted, a spring 33 is inserted in the space within the fitting member 19, and the shaft 28 is inserted into the shaft support recess 19d of the bearing mechanism from above. At this time, the opening projection 19i formed on the top opening of the shaft support recess 19d shown in FIG. 15 is elastically deformed by the shaft 28 and press-fitted. Furthermore, the opening peripheral edge part of the inlet 18Pa of the inlet forming member 18 is aligned with the opening and closing member 21, the inlet forming member 18 is fit with the fitting member 19 in resistance to the spring force of the spring 33, and also by engaging the engaged claw 18d of the inlet forming member 18 in the engaging recess of the fitting member 19, the fitting member 19 is made integral with the inlet forming member 18. By doing this, the flap valve mechanism 20 is assembled.

(2)-5 Opening and Closing Activation Mechanism 40

In FIG. 5, the opening and closing activation mechanism 40 is placed above and at the side of the opening and closing member 21 of the flap valve mechanism 20, and is a mechanism for performing the opening operation by being pressed by the tip of the fueling nozzle FZ, and as a major constitution of this, is equipped with a nozzle detection mechanism 50 and a locking mechanism 60.

Figure 17:
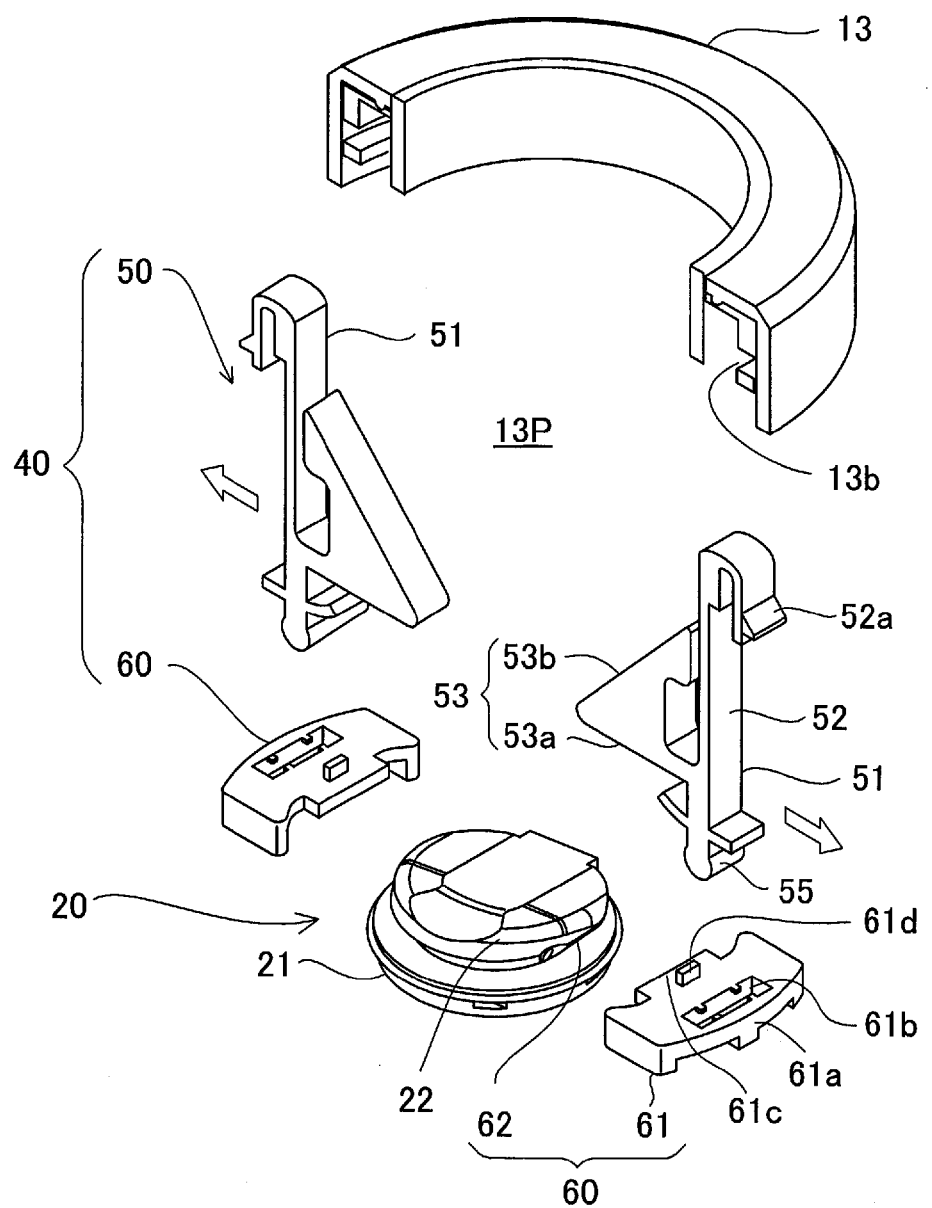
FIG. 17 shows the operation of the opening and closing activation mechanism.

FIG. 17 is an exploded perspective view of the opening and closing activation mechanism 40. In FIG. 5 and FIG. 17, the nozzle detection mechanism 50 is a mechanism that releases the locked position of the opening and closing member 21 of the flap valve mechanism 20 via the locking mechanism 60 by being pressed by the tip of the fueling nozzle FZ of a specified outer diameter, and it is equipped with nozzle detection members 51 supported on the aperture forming member 13. Each of the nozzle detection member 51 is equipped with a detection support unit 52 having an engaged claw 52a which is engaged with the engaging part 13b of the aperture forming member 13, an introduction pressing part 53 provided projecting from the lower part of the detection support unit 52 facing the insertion path 13P, and arranged at both sides of that, and an engaging cylindrical part 55 provided projecting at the bottom part of the introduction pressing part 53, and these are formed as a single unit. Each introduction pressing part 53 is equipped with a pressing support unit 53a, and a pressing incline 53b tilted in accordance with facing the insertion path 13P side from the pressing support unit 53a and facing downward. The pressing incline 53b is placed so as to be pressed by the tip of the fueling nozzle when the outer diameter of the tip of the fueling nozzle FZ is a specified diameter or greater. When the pressing incline 53b is pressed by the fueling nozzle FZ, the detection support unit 52 is elastically deformed in the outer diameter direction, and acts as a spring.

The locking mechanism 60 is equipped with a lock member 61 and a locked part 62 formed by a recess on the opening and closing member 21. The lock member 61 is equipped with a lock member main unit 61a which is a round arc shaped member, an engaging recess 61b that engages with the engaging cylindrical part 55 formed on the lock member main unit 61a, and a lock engaging part 61c provided projecting at the inner periphery side of the lock member main unit 61a. The locked part 62 is formed at the bottom part of the pressing member 22 of the opening and closing member 21, and is a site for engaging with the lock engaging part 61c, and by the lock engaging part 61c engaging with the locked part 62, this becomes a locked position that regulates the opening operation of the opening and closing member 21, and by moving from the center direction of the opening and closing member 21 to the diameter outward direction, it is released from the locked part 62, and becomes the unlocked position, allowing the opening operation of the opening and closing member 21.

Figure 18:
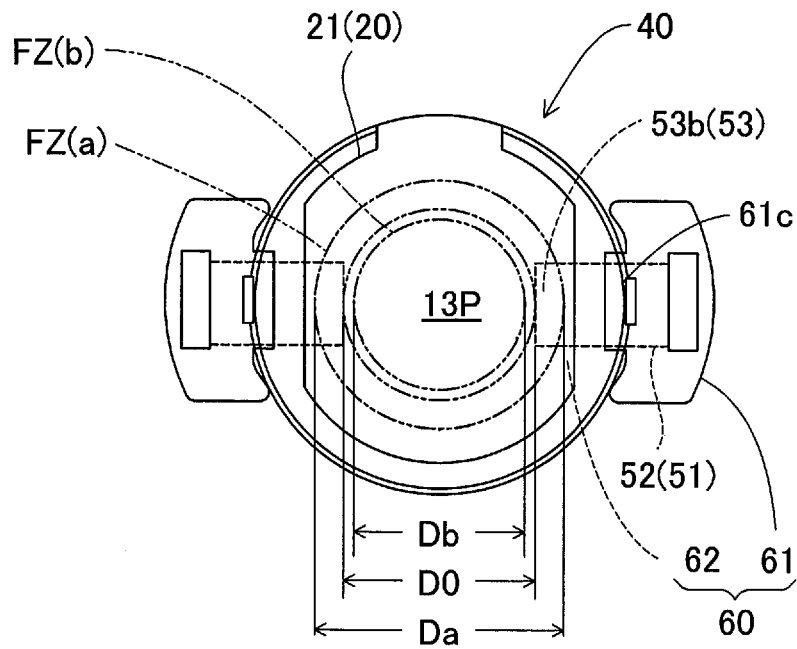
FIG. 18 shows the operation of the opening and closing activation mechanism.
Figure 19:
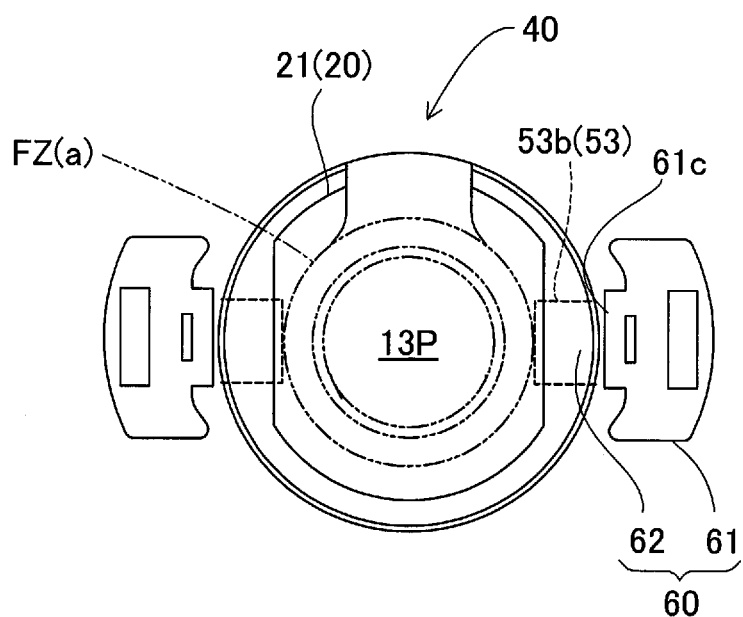
FIG. 19 shows the operation of the opening and closing activation mechanism.

FIG. 18 and FIG. 19 show the nozzle detection mechanism 50, where FIG. 18 shows the state before inserting the fueling nozzle, and FIG. 19 shows the state with the fueling nozzle inserted. Specifically, when the inner diameter of the insertion path 13P formed by the inner edges facing opposite the introduction pressing part 53 is D0, the outer diameter of the tip of the light oil fueling nozzle (FZa) is Da, and the gasoline fueling nozzle (FZb) is Db, then this is set to Db<D0<Da. For example, outer diameter Db is set to 20 mm, inner diameter D0 to 22 mm, and outer diameter Da to 25 mm.

With the constitution of the opening and closing activation mechanism 40, in the state shown in FIG. 18, the fueling nozzle FZa is inserted in the insertion path 13P, and presses the pressing incline 53b of the introduction pressing part 53 of the nozzle detection member 51, as shown in FIG. 17, the detection support unit 52 elastic deforms while increasing the spring force as the center of the engaged claw 52a supported on the engaging part 13b of the aperture forming member 13. By doing this, as shown in FIG. 19, the lock member 61 moves in the outer periphery direction, the locked position is switched to the unlocked position by releasing the lock engaging part 61c of the lock member 61 from the locked part 62, in other words, the lock of the opening and closing member 21 of the flap valve mechanism 20 is released, and the opening operation of the opening and closing member 21 becomes possible. Note that for the inner diameter DO of the insertion path 13P, even if it is a smaller diameter than the outer diameter Db of the gasoline fueling nozzle (FZb), as long as it is a diameter for which the lock will not be released when the tip outer periphery part of the fueling nozzle (FZb) presses the pressing incline 53b and does not allow fueling, a small amount of dimensional range is allowed.

Figure 20:
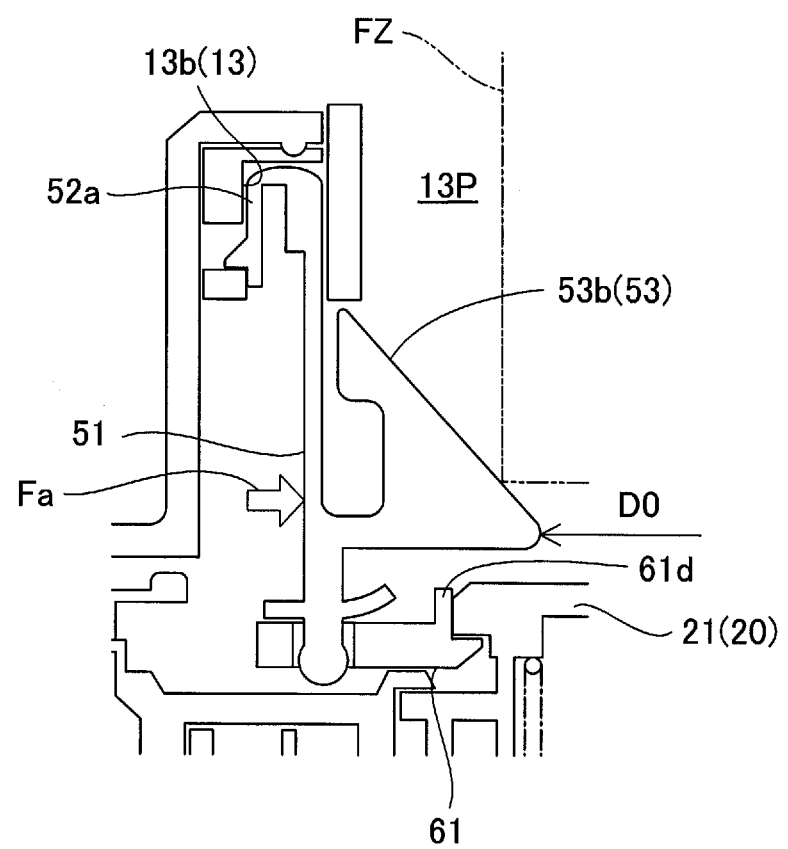
FIG. 20 shows a positioning mechanism of the closing activation mechanism.

The dimension tolerance of the inner diameter D0 of the insertion path 13P becomes a cause of misoperation depending on the type of fueling nozzle FZ, but the following constitution is used to make the misoperation smaller. As shown in FIG. 20, the nozzle detection member 51 is supported so that elastic force is generated at the lock engaging part 13b of the opening forming member 13 using the engaged claw 52a so as to apply force Fa in the inner diameter direction on the lock member 61. Also, a restriction projection 61d that touches the side end part of the opening and closing member 21 is formed on the end part front surface of the lock member 61. With this constitution, the nozzle detection member 51 is positioned by the restriction projection 61d touching the opening and closing member 21 since elastic force is applied in the inner diameter direction to the lock member 61, and furthermore, the inner diameter DO of the insertion path 13P defined by a pressing incline 53b is also determined. Therefore, the inner diameter D0 of the insertion path 13P is defined by the dimension of the outer diameter of the opening and closing member 21, and the dimension tolerances of a plurality of members are combined and do not become large, so it is possible to obtain high dimension precision.

Figure 1:
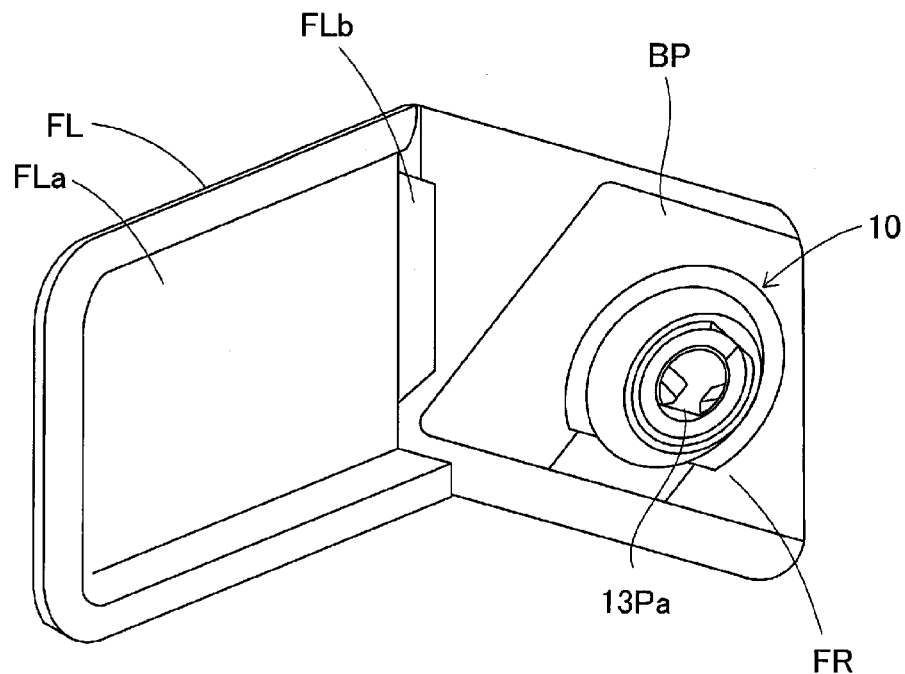
FIG. 1 is a perspective view showing the back part of a vehicle using the fuel tank opening and closing device of an embodiment of the present invention, and shows a state with the fueling lid open.

(3) Fuel Tank Opening and Closing Device Opening and Closing Operation (3)-1 Opening Operation As shown in FIG. 1, when the fueling lid FL is opened, the opening and closing device 10 placed inside the fueling chamber FR appears. As shown in FIG. 5, when the fueling nozzle FZ is inserted from the introduction port 13Pa of the aperture forming member 13, the tip of the fueling nozzle FZ reaches the introduction pressing part 53 of the nozzle detection mechanism 50, and presses the introduction pressing part 53, the pressing incline 53b receives the diameter direction force from the fueling nozzle FZ, as shown in FIG. 17 and FIG. 19, while the nozzle detection member 51 of the nozzle detection mechanism 50 is warped so that the spring force is accumulated, the engaged claw 52a opens and enlarges as the fulcrum point. When the nozzle detection member 51 opens and enlarges, the engaging cylindrical part 55 of the bottom part of the nozzle detection member 51 is moved in the outer diameter direction. By doing this, the lock member 61 is removed from the locked part 62, and this switches to the unlocked position and whereby the opening and closing member 21 opening operation is possible.

Furthermore, as shown in FIG. 8, when the fueling nozzle FZ is pressed in, the opening and closing member 21 of the flap valve mechanism 20 is pressed against the energizing force of the spring 33, and the opening and closing member 21 rotates with the support axis as the center, and the inlet 18Pa opens. At this time, as the degree of openness of the opening and closing member 21 becomes greater, while the tip of the fueling nozzle FZ follows the introduction guide surface 23b of the pressing member 22, the opening and closing member 21 opens. Then, the abutting part 27b of the valve positioning member 27 touches the inner wall of the connecting tube 12, and the opening operation of the opening and closing member 21 is completed. At this time, the outer peripheral part of the fueling nozzle FZ touches the positioning ridge line 23d of the pressing member 22, and the fueling nozzle FZ is positioned. In this state, fueling is done from the fueling nozzle FZ to the fuel path 11P.

(3)-2 Closing Operation

When fueling ends, and the fueling nozzle FZ is pulled out from the inlet 18Pa, the opening and closing member 21 of the flap valve mechanism 20 closes the inlet 18Pa by the restoration force of the spring 33, and furthermore, when the fueling nozzle FZ is pulled out, the nozzle detection member 51 and the lock member 61 return to the initial position, specifically, the introduction pressing part 53 returns to its original position by the elastic force of the detection support unit 52, and also, the lock member 61 moves to the center direction of the opening and closing member 21, and is engaged with the locked part 62. By doing this, the opening and closing member 21 returns to its closed initial state at the locked position of the lock member 61, and furthermore, the fueling lid FL (FIG. 1) is closed.

(4) Operation and Effect of the Fuel Tank Opening and Closing Device

The following operational effects are exhibited by the fuel tank opening and closing device 10 of the embodiment noted above.

(4)-1 As shown in FIG. 8, the fueling nozzle FZ is guided to the insertion direction by the nozzle positioning guide mechanism, and furthermore, when it reaches the insertion completion position, it is positioned within the fuel path 11P. Specifically, the first support mechanism of the nozzle positioning guide mechanism, which is formed at the opening peripheral edge of the introduction port 13Pa, slides the outer periphery part of the fueling nozzle FZ, while guides the fueling nozzle FZ in the insertion direction. The second support mechanism guides the tip of the fueling nozzle FZ using the introduction guide surface 23b of the guide curved surface 23a, and opens the inlet 18Pa by the opening and closing member 21, and furthermore guides the fueling nozzle FZ. The third support mechanism positions the fueling nozzle FZ at the insertion completion position as the valve positioning member 27 of the opening and closing member 21 touches the inner wall of the tank opening forming member 11, and stops any opening operation greater than that. Therefore, the fueling nozzle FZ is supported by the locations, that is, a first point is how the opening peripheral edge part (first support mechanism) of the introduction port 13Pa of the tank opening forming member 11, and a second point is how the outer peripheral part of the top of the fueling nozzle FZ is positioned in the left and right direction in relation to the insertion direction by the positioning ridge line 23d (second support mechanism), and a three point is how the valve positioning member 27 of the opening and closing member 21 (third support mechanism) touches the inner wall of the tank opening forming member 11, and is positioned in the vertical direction in relation to the insertion direction.

Therefore, when inserting the fueling nozzle FZ in the fuel path 11P, the fueling nozzle FZ is guided without swaying until it reaches the insertion completion position after opening of the opening and closing member 21 from the insertion path 13P by the nozzle positioning guide mechanism, so it is possible to perform the insertion work smoothly and easily. In fact, the fueling nozzle FZ is positioned in relation to left and right and the vertical direction in relation to the insertion direction at three locations using the insertion completion position, so it is possible to do fueling of a suitable volume without imprudent operation of auto stop when fuel droplets or the like touch inside the fuel path 11P.

(4)-2 With this embodiment, because the gun stopper 13$a$ is arranged on the outside from the inlet 18Pa, when a short fueling nozzle FZ is inserted in the fuel path 11P, the tip of the fueling nozzle FZ may not enter sufficiently to the depth position of the fuel path 11P, in other words, the fuel path 11P of the fuel tank side from the flap valve mechanism 20. To deal with such a case, even if a positioning member is provided for positioning the tip of the fueling nozzle FZ at the periphery of the flap valve mechanism 20, trouble occurs with the opening and closing operation of the opening and closing member 21, so it is not possible to provide a positioning member. However, with this embodiment, it is possible to reliably position the tip of the fueling nozzle FZ using the positioning ridge line 23$d$ of the pressing member 22, so it is possible to make the constitution simple without needing to provide a separate positioning mechanism at the periphery of the flap valve mechanism 20.

(4)-3 As shown in FIG. 5 and FIG. 17, the nozzle detection mechanism 50 is equipped with an introduction pressing part 53 arranged so as to be pressed by the fuel nozzle FZ when the outer diameter of the tip of the fueling nozzle FZ is a specified diameter or greater, so in the case of a light oil fueling nozzle (FZa), the opening and closing member 21 of the flap valve mechanism 20 performs the opening operation, but in the case of the gasoline fueling nozzle (FZb), the opening and closing member 21 does not perform the opening operation. Therefore, when the type of fuel differs according to the outer diameter of the fueling nozzle FZ, even when the fueling nozzle FZ is erroneously inserted, the inlet 18Pa does not open, so the wrong type of fuel is not supplied.

(4)-4 The tank opening forming member 11 and the pressing member 22 are formed from conductive materials having conductivity, and constitute the grounding path to the car body side member of a vehicle. Specifically, as shown in FIG. 11 and FIG. 12, when the fueling nozzle is inserted in the insertion path 13P, and touches the pressing member 22, the fueling nozzle is connected to the grounding path to the car body side member via the discharge projection 23$e$ that forms the second gap Gp2 narrower than the first gap GP1 between the outer periphery part of the pressing member 22 and the inner wall of the tank opening forming member 11, and furthermore via the tank opening forming member 11. Thus, even when static electricity is charged in the person holding the fueling nozzle, this is quickly removed through the grounding path. In this way, to ensure the grounding path of the fuel tank opening and closing device, the tip of the fueling nozzle uses the initial contact pressing member 22, so wiring a ground wire is not necessary, and the constitution becomes simple. Also, before the fueling nozzle opens the opening and closing member 21, since the fuel nozzle FZ touches the pressing member 22, there is also no discharging on the fuel tank side from the opening and closing member 21.

(4)-5 The tip of the discharge projection 23$e$ and the discharge projection 15$b$ of the aperture forming member 13 are sharpened, and in fact a plurality of discharge projections 15$b$ are arranged along the outer form of the pressing member 22 along the discharge projection 23$e$, so the grounding path is reliably ensured.

(4)-6 For the grounding means, the pressing member 22 and the tank opening forming member 11 are formed using a conductive material, so the constitution is simple without arranging a separate conductive line in the vicinity of the inlet as was the case with the prior art, and without increasing the number of parts.

(4)-7 As shown in FIG. 13 through FIG. 15, the opening and closing member 21 is supported so as to be able to rotate by inserting the shaft 28 in the shaft support recess 19$d$ of the bearing mechanism provided on the tank opening forming member 11. A plurality of shaft restriction projections 19$e$ having a cross section arc shaped shaft support surface 19$z$ are provided projecting on the inner wall of the shaft support recess 19$d$, and are supported so as to be rotatable in contact with a portion of the outer periphery of the shaft 28. The plurality of shaft restriction projections 19$e$ are divided by the groove between them, and the forming work is easier than a case of supporting the shaft 28 formed on the cross sectional circle only by the shaft support recess 19$d$, because it is not necessary to have high forming precision for the shaft support surface 19$z$ of each shaft restriction projection. In fact, the shaft 28 constantly applies a large force to the bottom arc portion 19$f$ and the first side arc portion 19$g$ within the operating range of the opening and closing member 21, and does not apply a large force to the second side arc portion 19$h$, so it is sufficient to form the bottom arc portion 19$f$ and the first side arc portion 19$g$ with high precision, and it is not necessary to form with high precision across the entire circumference including the second side arc portion 19$h$, so forming work becomes easier.

(4)-8 When the tank opening forming member 11 is formed using resin, due to shrinkage of the resin, each shaft restriction projection 19$e$ is supported following part of the outer periphery of the shaft 28 of the opening and closing member 21 so that shaft core displacement of the shaft 28 does not occur even if the circle shape formed by their arcs is slightly deformed, so there is no unevenness or decrease in the seal surface pressure of the opening and closing member 21 that comes with positional displacement of the shaft 28. In fact, the force of the shaft 28 during opening and closing of the opening and closing member 21 is mainly applied by the bottom arc portion 19$f$ and the first side arc portion 19$g$ of the shaft restriction projection 19$e$, and support is achieved with a narrow area, so it is possible to further prevent unevenness of the seal surface pressure.

(4)-9 If the shaft 28 of the opening and closing member 21 is inserted from the opening above the shaft support recess 19$d$, even if the shaft support recess 19$d$ and the shaft 28 are slightly displaced, insertion and assembly can be done easily, so the insertion load is small, and the workability is good.

(4)-10 The opening projection 19$i$ formed on the opening of the shaft support recess 19$d$ holds the shaft 28 inside the shaft support recess 19$d$ and retains that shaft 28 by elastically deforming when inserting the shaft 28 in the shaft support recess 19$d$, so the assembly workability is good, and it is possible to further prevent positional displacement due to external force of the shaft 28.

(4)-11 As shown in FIG. 14, the inlet forming member 18 and the fitting member 19 for supporting the flap valve mechanism 20 are constituted divided, so when these are integrated, the restraining member 18$e$ is inserted in the inlet forming member 18, and the opening of the shaft support recess 19d is plugged, so it is possible to prevent slipping out of the shaft 28 due to external force.

Note that this invention is not limited to the embodiment noted above, and it is possible to implement various modes in a range that does not stray from the spirit of the invention, and it is possible to have the following kind of variation as well, for example.

For the grounding means of the embodiment noted above, in addition to forming all of the pressing member using a conductive resin, it is also possible to form only the surface of the top surface part, or to do insertion formation of a metal thin plate or the like on the surface. Furthermore, the grounding path can be formed in a plurality of locations on the outer peripheral part of the pressing member 22 if it is a position for which discharge is possible in a state with the opening and closing member 21 closed.

Furthermore, with the embodiment noted above, we described a constitution equipped with a nozzle detection mechanism, but this is not limited to this, and it is also possible to apply this to a mechanism that is not equipped with a nozzle detection mechanism.

With the aforementioned embodiments, the shaft support recess 19d of the bearing mechanism is constituted and equipped with an opening that opens in the opposite direction to the insertion direction of the fueling nozzle FZ, but as long as the shape is easy for inserting the shaft 28 into the shaft support recess 19d, it can be an elongated hole or an L shape.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A fuel tank opening and closing device for opening and closing a path for supplying fuel to a fuel Link, the fuel tank opening and dosing device comprising:
    a tank opening forming member for forming an insertion path for inserting a fueling nozzle and a fuel path which has an inlet connected to the insertion path and is connected to the fuel tank, the tank opening forming member including a connecting tube which forms the fuel path, an inlet forming member including the inlet and mounted inside the connecting tube, and a fitting member attached to the inlet forming member, and
    a flap valve mechanism arranged inside the tank opening forming member, the flap valve mechanism having an opening and closing member for opening and closing the inlet by being pressed by an end of the fueling nozzle, a shaft provided at an end of the opening and closing member, and a bearing mechanism provided on the fitting member of the tank opening forming member, the bearing mechanism having a shaft support recess receiving and rotatablv supporting the shaft, wherein:
    a plurality of shaft restriction projections project from a wall surface of the shaft support recess,
    each of the shaft restriction projections has a shaft support surface shaped as arc surface in a cross section and each shaft support surface being configured to contact a part of an outer periphery of the shaft, the shaft restriction projections including a bottom arc portion that is formed on a bottom of the shaft support recess and a side arc portion that is formed close to the bottom arc portion in a circumferential direction of the shaft across a groove,
    the shaft support recess includes an opening that opens in an opposite direction to an insertion direction of the fueling nozzle,
    the inlet forming member includes a restraining member arranged within the opening of the shaft support recess, the restraining member retaining the shaft,
    the shaft restriction projections include an opening projection that restricts a width of the opening of the shaft support recess to a width more narrow than a diameter of the shaft, and
    the opening projection elastically deforms and holds the shaft at a position touching the shaft restriction projections when the shaft is inserted in the shaft support recess for preventing the shaft from slipping off the shaft support recess.

2. The fuel tank opening and closing device in accordance with claim 1, wherein
    a virtual inner diameter is the same or slightly larger than an outer diameter of the shaft, where the virtual inner diameter is defined by an inner diameter of a circle formed following the shaft support surfaces of the shaft restriction projections.

3. The fuel tank opening and closing device in accordance with claim 1, wherein
    the side arc portion comprises a first side arc portion and a second side are portion arranged at both sides of the circumferential direction of the bottom arc portion, and
    the first side arc portion is arranged at a position for which the load received from the shaft during opening and closing of the opening and closing member is greater than that of the second side arc portion.

4. A fuel tank opening and closing device for opening and closing a path for supplying fuel to a fuel tank, the fuel tank opening and closing device comprising:
    a tank opening forming member for forming an insertion path for inserting a fueling nozzle and a fuel path which has an inlet connected to the insertion path and is connected to the fuel tank, the tank opening forming member including a connecting tube which forms the fuel path, an inlet forming member having the inlet mounted inside the connecting tube, and a fitting member attached to the inlet and forming the shaft support recess, and
    a flap valve mechanism arranged inside the tank opening forming member, the flap valve mechanism having an opening and closing member for opening and closing the inlet by being pressed by an end of the fueling nozzle, a. shaft provided at an end of the opening and closing member, and a bearing mechanism provided on the fitting member of the tank opening forming member, the bearing mechanism including a shaft support recess which receives and rotatably supports the shaft, wherein
    a plurality of shaft restriction projections project from a wall surface of the shaft support recess,
    each of the shaft, restriction projections has a shaft support surface shaped as arc surface in a cross section and each shaft support surface being configured to contact a part of an outer periphery of the shaft, and
    the inlet forming member includes a restraining member that is inserted in the opening of the shaft support recess and retains the shaft.

5. The fuel tank opening and closing device in accordance with claim 4, wherein a virtual inner diameter is the same or slightly larger than an outer diameter of the shaft, where the virtual inner diameter is defined by an inner diameter of a circle formed following the shaft support surfaces of the shaft restriction projections.

* * * * *